Figure 1:
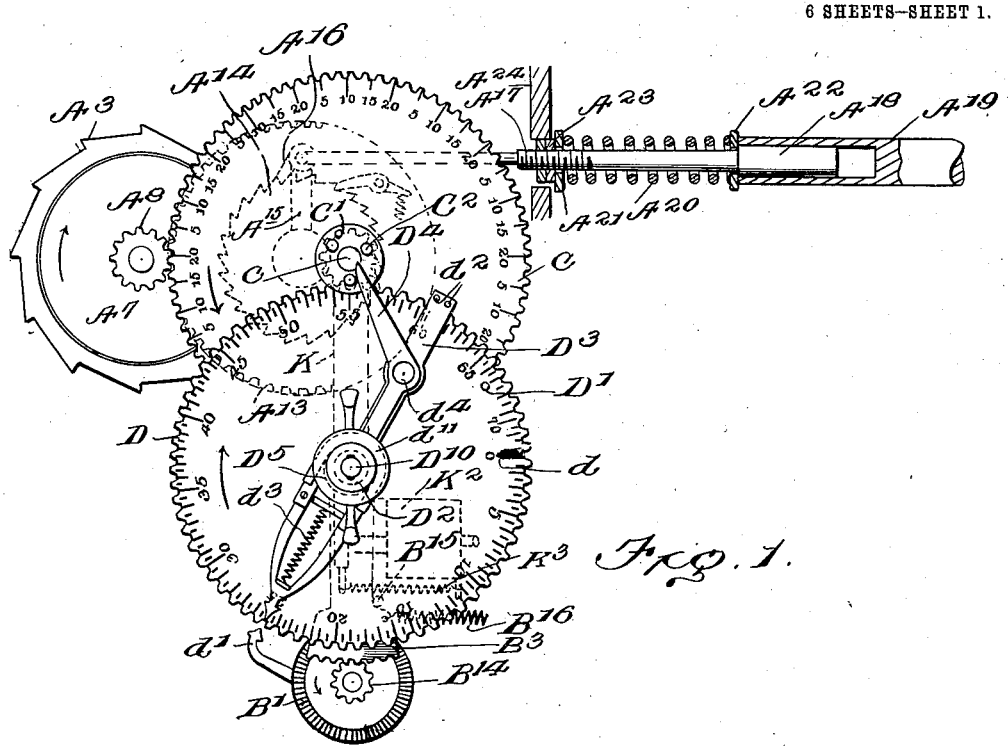

R. C. ELLIOTT.
LINE MEASURING AND AUTOMATIC JUSTIFYING MECHANISM FOR COMPOSING MACHINES.
APPLICATION FILED SEPT. 30, 1908.

1,024,503.

Patented Apr. 30, 1912.

6 SHEETS—SHEET 1.

Inventor
R. C. Elliott

By Church & Church
his Attorneys

Witnesses
Elizabeth Gillett

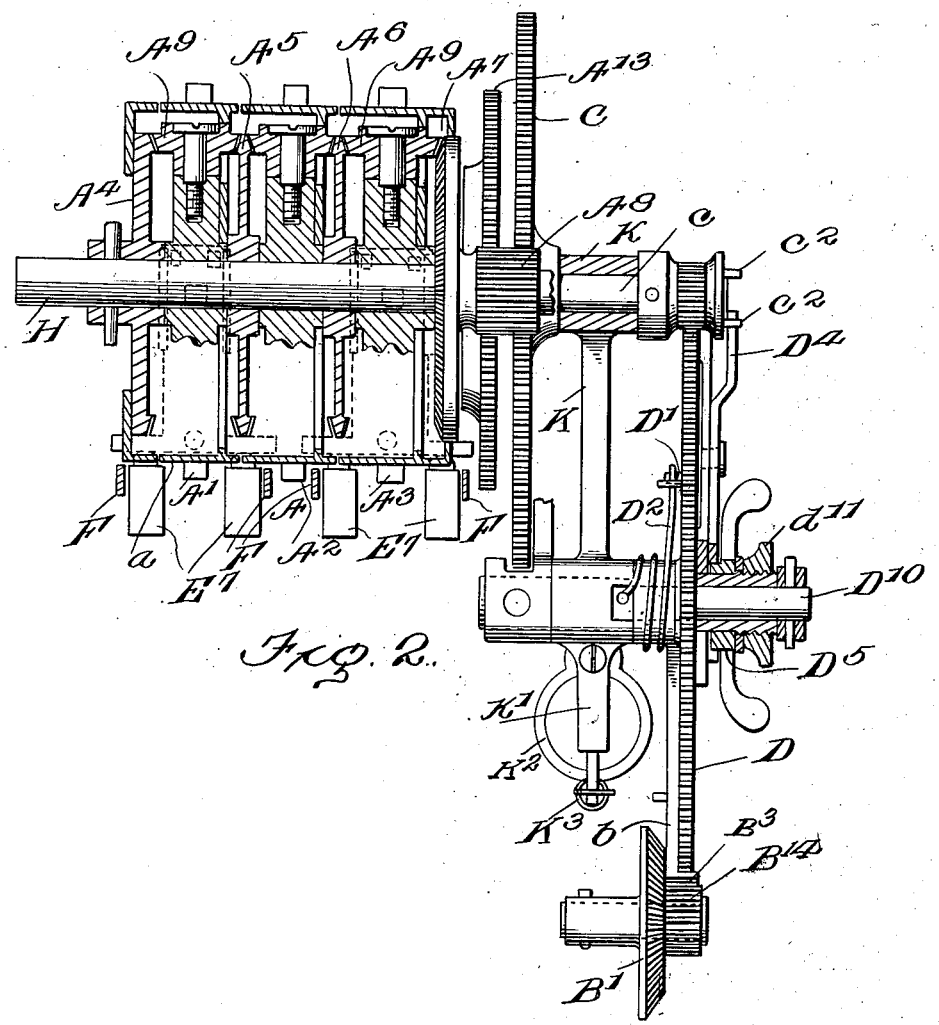
R. C. ELLIOTT.
LINE MEASURING AND AUTOMATIC JUSTIFYING MECHANISM FOR COMPOSING MACHINES.
APPLICATION FILED SEPT. 30, 1908.
1,024,503.
Patented Apr. 30, 1912.
6 SHEETS—SHEET 2.

R. C. ELLIOTT.
LINE MEASURING AND AUTOMATIC JUSTIFYING MECHANISM FOR COMPOSING MACHINES.
APPLICATION FILED SEPT. 30, 1908.
1,024,503.
Patented Apr. 30, 1912.
6 SHEETS—SHEET 3.
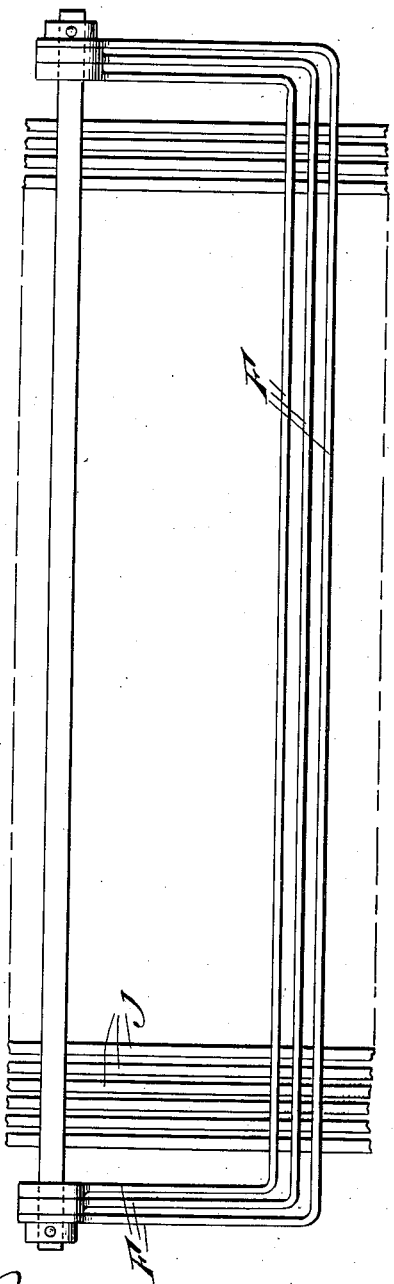
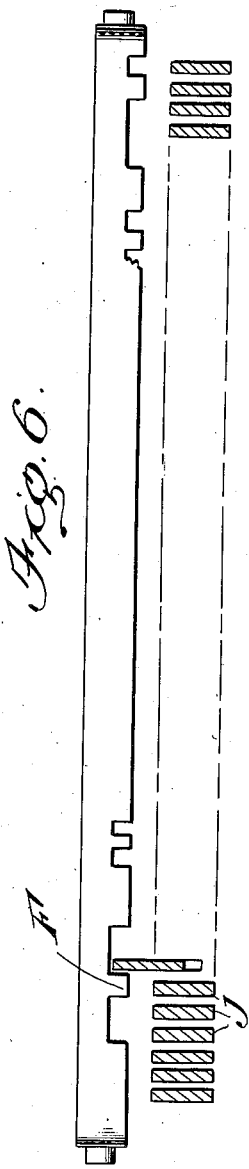
Inventor
R. C. Elliott.

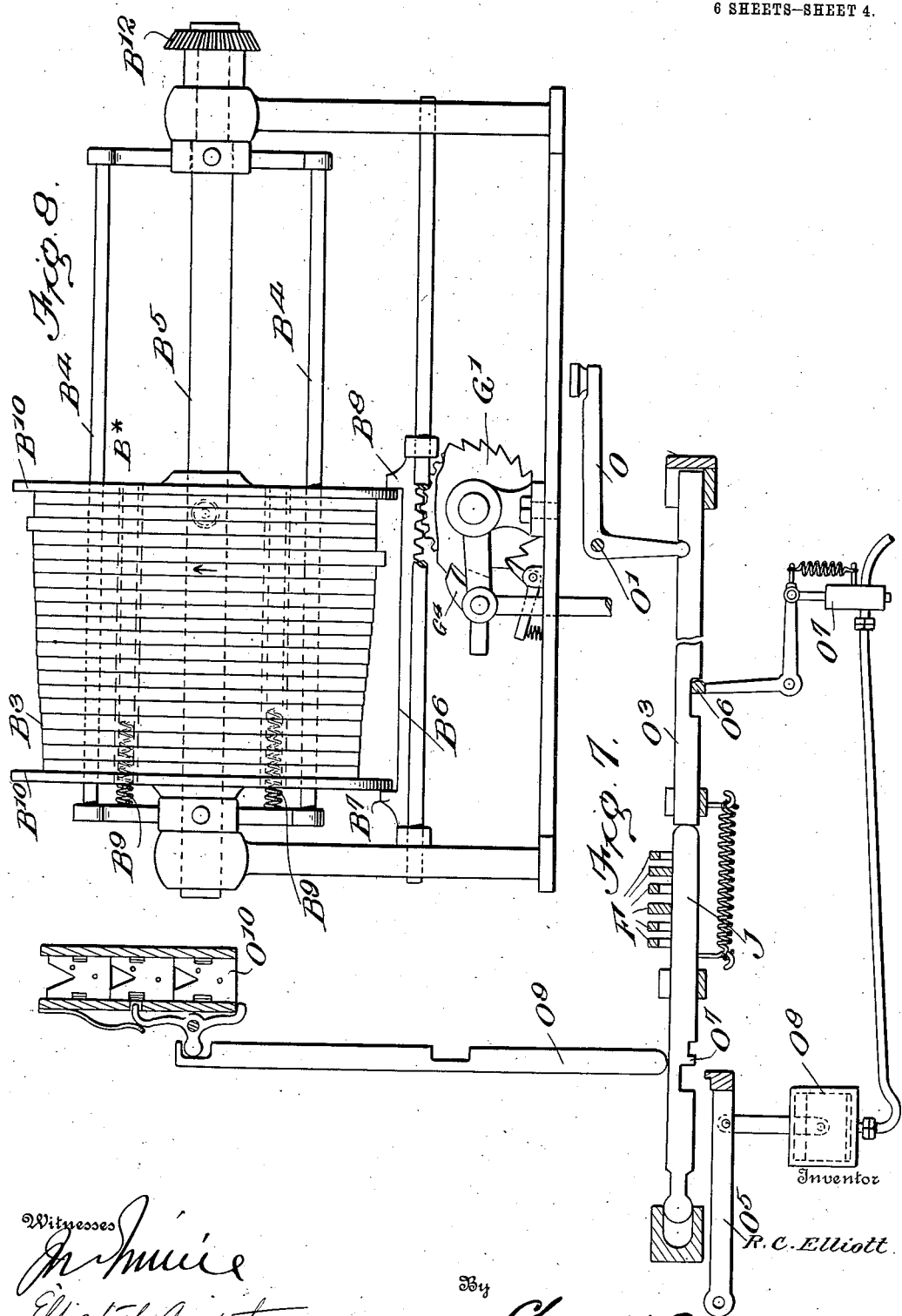

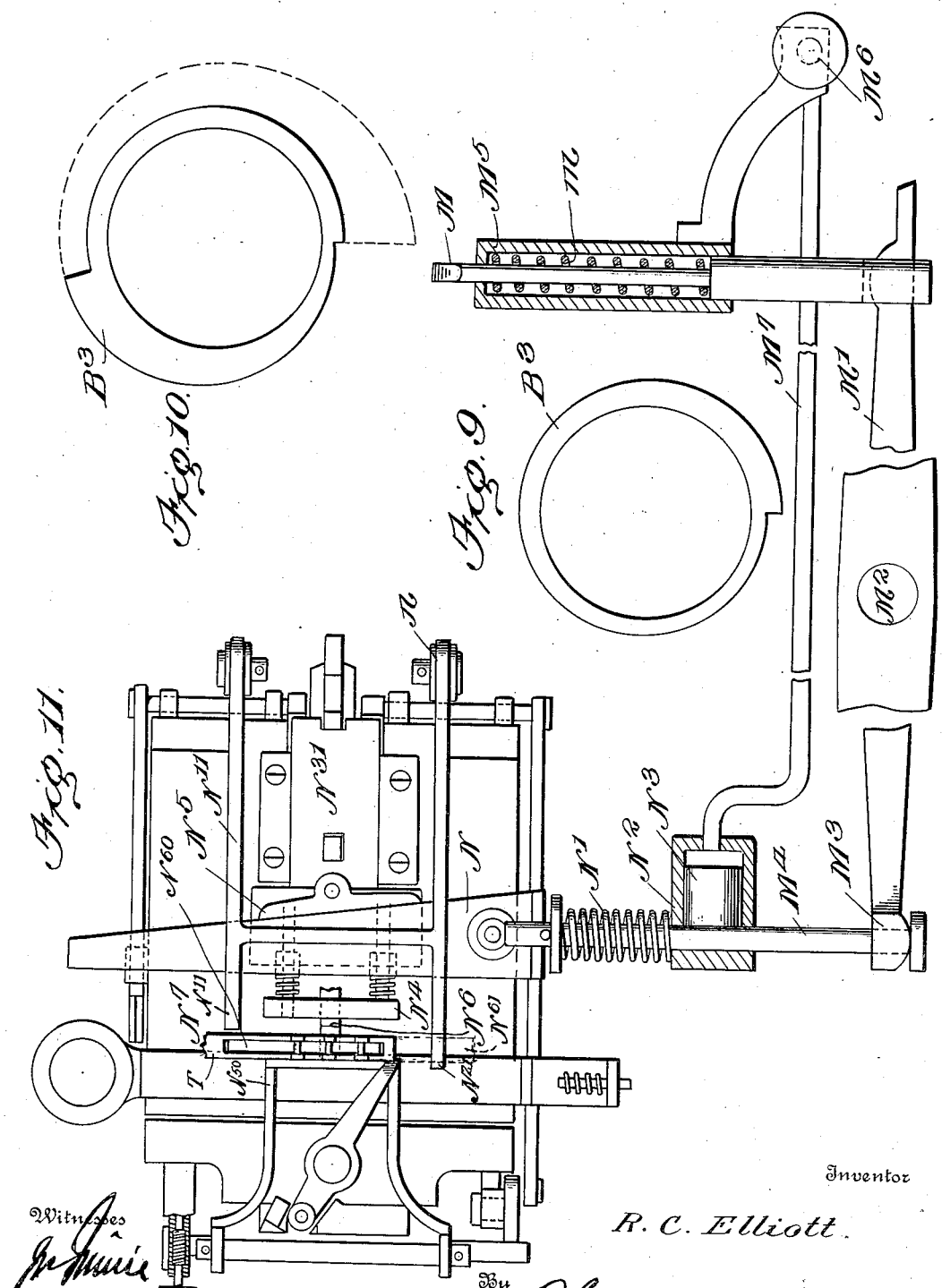

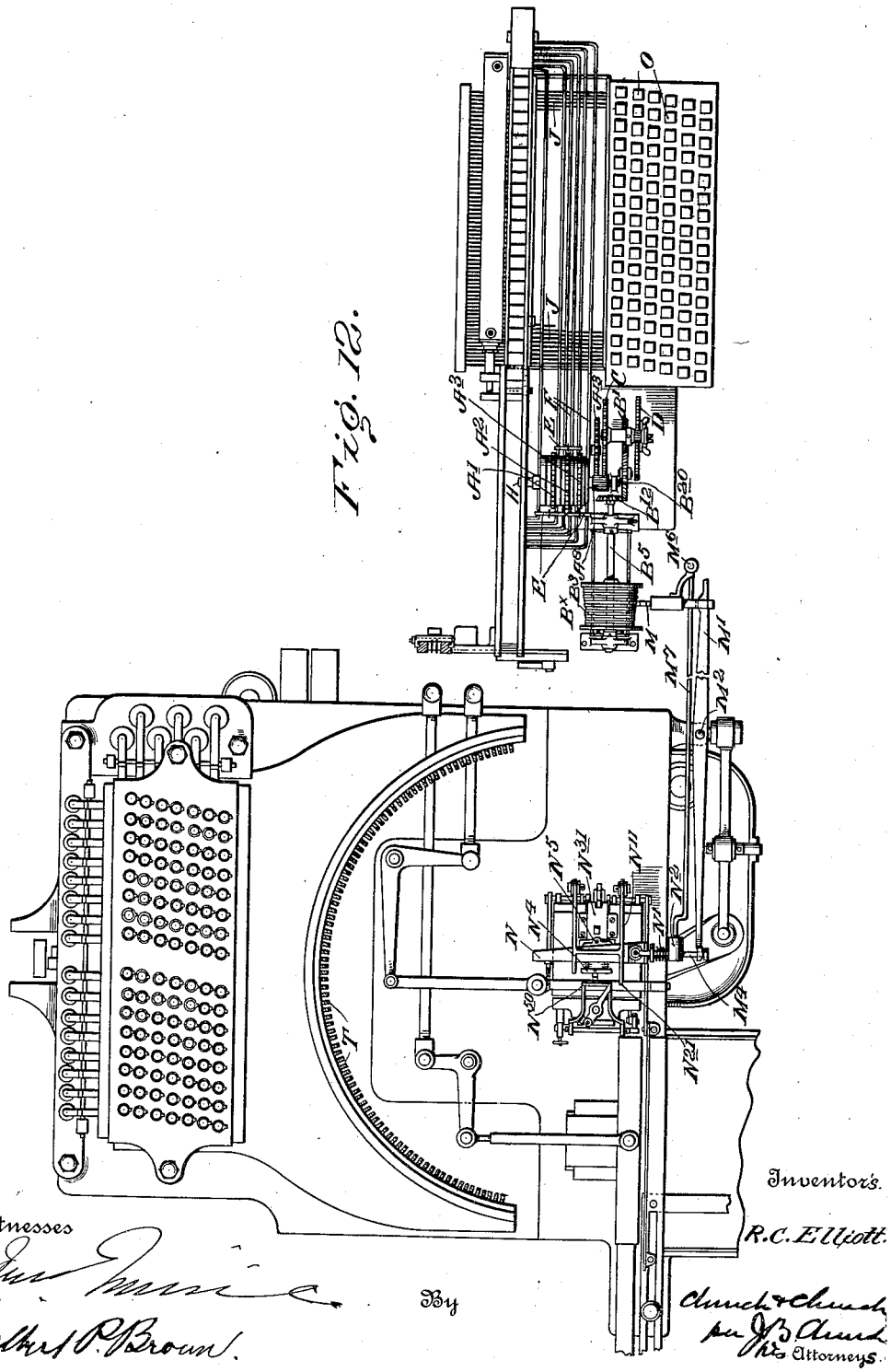

UNITED STATES PATENT OFFICE.

RICHARD CORNELIUS ELLIOTT, OF CLAPHAM, LONDON, ENGLAND, ASSIGNOR TO LANSTON MONOTYPE MACHINE COMPANY, OF PHILADELPHIA, PENNSYLVANIA, A CORPORATION OF VIRGINIA.

LINE-MEASURING AND AUTOMATIC JUSTIFYING MECHANISM FOR COMPOSING-MACHINES.

1,024,503.      Specification of Letters Patent.     Patented Apr. 30, 1912.

Application filed September 30, 1908. Serial No. 455,541.

*To all whom it may concern:*

Be it known that I, RICHARD CORNELIUS ELLIOTT, a subject of the King of Great Britain, of Clapham, in the county of London, England, have invented a certain new and useful Improvement in Line-Measuring and Automatic Justifying Mechanism for Composing-Machines; and I do hereby declare the following to be a full, clear, and exact description of the same, reference being had to the accompanying drawings, forming a part of this specification, and to the figures and letters of reference marked thereon.

This invention relates to mechanism for registering total values in comparison with a standard and dividing the ascertained excess or deficiency into a predetermined number of parts, and is specially designed for use in connection with key-controlled type or pattern composing machines for ascertaining the deficiency of the composed matter and the dimensions or fractional increase in the size of the spaces or some of them necessary to fill out or justify each line of composition.

In the more common forms of type casting and composing machines the keys do not act directly upon the type mechanism proper or directly affect the selection or forming of the type; on the contrary they generally operate in connection with a controller or pattern, to record the type signals representing successive lines of matter, the controller subsequently operating in conjunction with the type forming setting or impression mechanism to reproduce the matter thus set up or impressed.

The space accorded each character is, as is well known, of a normal or standard width, set away; but the operator cannot, except by an elaborate and tedious computation, determine beforehand from his "copy" how many "ems" or "units" the matter constituting a line will occupy, nor the amount of line space remaining to be filled out by justification, hence it is usual to supply the composing mechanism with means for measuring the space value of each type and space composed, for instituting a comparison of the total space registered with the measure or line standard, and for indicating the justification fraction for the line, *i. e.*, the quotient of the ascertained line deficiency divided by all or a predetermined number of the spaces contained in the composed line.

In type casting machines this justification fraction is distributed throughout the spaces of each line by adjustments affecting certain type only, such as the spaces or quads, so that these will be cast of abnormal width, that is to say, each of a standard or normal width plus the justification fraction. Thus, in the production of types for any given line the space that would otherwise have to be filled out by justification, if types of normal width were used, is absorbed or filled out by the bodies of the widened or abnormal types, resulting in the production of a justified line.

The aforesaid pattern or controller may consist of a strip of paper prepared in a machine wherein, by manipulation of keys, perforations or combinations of perforations are produced representing each character, space, or the like to be cast. The machine of Patent No. 654,115, dated July 17, 1900, to which the present invention is in part applicable, is an example of this type. Or the controller may consists of a series of separate and independent plates or selectors which bear perforations, marks or the like representing individual characters etc., and which, according to their denomination, are stored in magazines, the delivery and assembly of the selected members being controlled by keys. The machine of Patent No. 897,358, September 1, 1908, is an example of this type and the present invention is also applicable thereto.

In the last named machine the mechanisms for preparing the controller and for casting and setting up the type instead of being contained in separate and independent machines, are combined in a single machine; and there are other known forms of key actuated composing machines and controllers to which the present invention is applicable.

The principal objects of the present invention are to increase the speed and capacity of the registering devices, and to provide means for automatically effecting or controlling the set of the space adjusting mechanism of the casting machine, thus eliminating selective action to this end on the part of the compositor and avoiding errors due to inattention or mistakes on his part.

To these ends the invention consists in the novel construction, combination and arrangement of parts as hereinafter fully described and pointed out in the appended claims.

Figure 3:
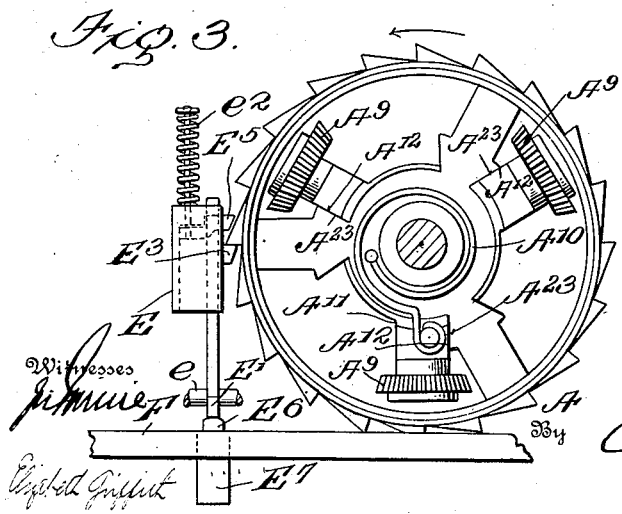
Figure 4:
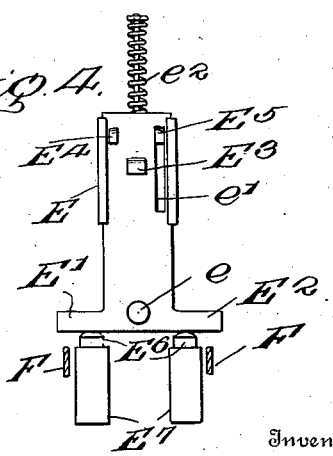

In the accompanying drawings illustrating preferred forms of embodiment of said invention—Figure 1 is a front elevation of the differential and release mechanism and connections forming part of the registering mechanism. Fig. 2 is a transverse vertical section with some parts in elevation of the mechanism Fig. 1. Fig. 3 is an end view of one section of the differential gear and release devices. Fig. 4 is a front elevation showing one of the multiple escapement devices for controlling the advance of a single differential gear section. Fig. 5 is a plan view and Fig. 6 a sectional elevation of means for coupling the keys with the various escapement devices. Fig. 7 is a section elevation illustrating the manner of coupling up the registering devices with the keys of a combined composing and casting machine. Fig. 8 is a front elevation of the translating devices employed in connection with the registering devices for automatic adjustment. Figs. 9 and 10 respectively represent two sections of the drum forming part of the translating devices of Fig. 8. Fig. 11 is a top plan view of a means for connecting the translating devices of Fig. 8 with mold adjusting devices. Fig. 12 is a top plan view of a type casting machine with the improvements applied thereto.

The same letters indicate like parts in the several figures.

The registering mechanism includes among its principal features a plurality of individual registering devices each adapted to register a different value or number of units and so connected through a differential transmission mechanism common to all that any two or more of said registering devices may be simultaneously operated without interference, and the sum of their individual action transmitted to the total register.

In the preferred form of embodiment illustrated the individual registering devices are each represented by a ratchet-toothed wheel or drum $A'$, $A^2$, $A^3$ (three only are shown although any number desired may be employed) and a coöperating detent or escapement E; and the differential transmission mechanism is represented by fixed gear $A^4$, movable gear $A^7$, intermediate double-faced gears $A^5$, $A^6$ and pinions $A^9$, each of the latter connected directly or indirectly with the ratchet-toothed wheels and carried bodily therewith.

The teeth of each ratchet wheel $A^1$, $A^2$ and $A^3$ differ in pitch from those of its neighbors, the pitch corresponding to different unit-values, so that each wheel will record a predetermined number of units, and alternate ratchet wheels rotate in relatively opposite directions, that is wheels $A'$ and $A^3$ rotate in the same direction and $A^2$ in opposition thereto.

What is herein referred to as a differential transmission mechanism is one whereby the measured motion of any individual registering device supplements that of any other of the associated individual registering devices so that when two or more of said registering devices are simultaneously operated the sum of their individual motions or measures will be transmitted to the final or total registering device or devices.

In the preferred form of embodiment of such a mechanism herein illustrated the several ratchet wheels are supported side by side and are free to revolve separately about the fixed shaft H, and each of said wheels carries upon a radially disposed axis or axes one or more (preferably three) pinions $A^9$ lying transverse to and extending on opposite sides of the supporting arms or web. The pinion or pinions $A^9$ pertaining to the ratchet wheel at one end of the series engages gear $A^4$ fixed to shaft H, while the pinion or pinions $A^9$ of the ratchet wheel at the opposite end of the series engages the gear $A^7$, movable on shaft H, while the pinions of adjacent ratchet wheels mesh with double faced gears $A^5$, $A^6$, the latter turning loosely on shaft H. The arrangement is such that the motion of translation communicated from any one of the ratchet wheels to the pinion or pinions $A^9$ associated therewith will effect a corresponding movement of wheel $A^7$, irrespective of the position of said ratchet wheel in the series. Thus if the ratchet wheel next the loose wheel $A^7$ is advanced, the motion of translation of its pinion $A^9$ will cause the latter to revolve about its axis by virtue of its engagement with the now stationary gear $A^6$, thereby effecting a proportional advance of the gear $A^7$. In like manner if ratchet wheel $A^2$ is advanced its motion of translation in conjunction with its engagement with the now stationary gear $A^5$ will effect a corresponding advance of gear $A^6$, but in a direction opposite the movement of ratchet wheel $A^3$ so that if the latter is at the time stationary, the movement thus communicated to gear $A^6$ will be transmitted through the pinion $A^9$ of the ratchet wheel $A^3$ to gear $A^7$ said pinion $A^9$ being free to turn upon its axis and thereby communicate the motion of gear $A^6$ to gear $A^7$. If two or more of the ratchet wheels are advanced at the same time the sum of the movements of translation of these respective pinions $A^9$ will be transmitted to gear $A^7$. Thus, if the ratchet wheels $A'$ and $A^2$ advance simultaneously and in relatively opposite directions, the motion of translation of the pinion pertaining to ratchet wheel $A'$ will correspondingly advance gear $A^5$ in the same direction with said ratchet wheel, the motion thus given being transmitted through pinion $A^9$ of ratchet wheel $A^2$ to gear $A^6$, and at the same time this motion is augmented or increased by the movement of translation of pinion $A^9$ derived from the motion of its ratchet wheel $A^2$. And if ratchet wheel $A^3$ is also advanced at the same time with ratchet wheels $A'$ $A^2$ the motion of translation communicated to its pinion $A^9$ will correspondingly increase the extent of rotary motion transmitted to gear $A^7$.

The registering mechanism is under the influence of a motor, preferably provided with a spring, of which latter one end is connected to a wheel $A^{13}$ in gear with pinion $A^8$, and the other to a winding drum in the usual manner, said motor tending to rotate the members thereof but actually rotating only such as are released by the respective detents $E$, as hereinafter explained. There is a tendency, therefore, to run down this spring and means are provided for winding the same up, as required, to maintain the desired degree of tension or pressure. To this end the winding drum to which the spring it attached is provided with a ratchet wheel $A^{14}$, Fig. 1, on whose spindle is mounted an arm $A^{15}$ carrying a pawl $A^{16}$ engaging the teeth of the ratchet wheel, a suitable holding pawl being also provided for preventing return motion. Coupled with arm $A^{15}$ is a rod $A^{17}$ carrying a piston $A^{18}$ working in a cylinder $A^{19}$, the latter communicating with the air pressure chamber through the character keys of the keyboard in such manner that each character key when struck will admit air under pressure to cylinder $A^{19}$ with a tendency to force the piston forward and cause pawl $A^{16}$ to advance ratchet wheel $A^{14}$ and wind up the spring.

To regulate the action of the piston and to retract the latter after pressure in its cylinder is withdrawn, a spring $A^{20}$ is interposed between two collars $A^{22}$, $A^{23}$, loosely fitted to rod $A^{17}$, one of said collars $A^{22}$ engaging a shoulder on the rod and a fixed abutment, such as the end of the cylinder $A^{19}$, and the other $A^{23}$, held to the rod by adjusting nuts, for varying the tension of the spring, and arranged to engage a fixed abutment $A^{24}$.

In order that the total registering or ad-measuring devices, may be advanced in accordance with or proportional to the number of units registered, the pitch of the ratchet teeth on each of the wheels $A'$, $A^2$, and $A^3$, are made to correspond to certain units which the various type occupy, or some of these type may be multiples of the unit indicated by the teeth of the ratchet wheels. Thus in the example shown the teeth of wheel $A'$ are spaced to correspond with a measure of two units, those of wheel $A^2$, three units, and those of wheel $A^3$, five units, and mechanism is provided by which each of these wheels may be moved the distance of one or two teeth at will. Provision is also made whereby any one, two or all the wheels can be advanced separately or simultaneously as required. Thus through the differential gear the cumulative effect of the different registering devices when actuated separately or simultaneously is imparted to the total measuring devices.

The movements of each of the several individual registering devices are determined and controlled, in the present instance, through the medium of an escapement device $E$ in the form of a T-bar furnished with two or more (preferably three) teeth $E^3$, $E^4$, $E^5$ and pivotally supported, as at $e$, opposite its ratchet wheel or drum in position to oscillate transversely of the teeth thereon. The escapements $E$ pertaining to the first and third ratchet wheels $A'$ and $A^3$ are indicated by dotted lines in Fig. 2, while that of the second wheel $A^2$ does not appear in said figure since it is mounted on the opposite side and obscured by the drums. The teeth $E^3$, $E^4$, $E^5$, are spaced in the direction of movement of the escapement device $E$, to permit successive teeth to be interposed in the plane of movement of the ratchet wheel, and the two outer teeth $E^4$ and $E^5$ are also spaced from the intermediate tooth $E^3$, in the direction of the plane of movement of the ratchet teeth, by an amount somewhat less — preferably one half — the pitch of the teeth on the ratchet wheel with which they are associated.

Teeth $E^3$ and $E^4$ are fixed on the escapement bar, and when the latter is in its intermediate or normal position tooth $E^3$ lies in the plane of movement of the ratchet teeth and through its engagement with one of the latter holds the registering devices stationary against the pressure of the motor tending to advance the same. If, now, the escapement device is moved to the right, Fig. 4, tooth $E^4$ will be interposed in the path of the ratchet teeth simultaneously with the withdrawal of tooth $E^3$, and the registering device will be permitted to advance under the influence of its motor until arrested by the engagement of said tooth $E^4$, and upon the return of the escapement device to normal position tooth $E^3$ will be substituted for tooth $E^4$ and the measured movement of the registering device equal to the pitch of the ratchet teeth will be completed. Thus the movement effected by the successive presentations of these teeth $E^3$, $E^4$, corresponds with the units of the registering device with which they are associated, this unit as before explained being equal to two units of type measure for ratchet wheel $A'$, three units for ratchet wheel $A^2$ and five units for ratchet wheel $A^3$, although, as is obvious, any other proportioning or distribution of units may be employed.

The tooth $E^5$, unlike $E^3$ and $E^4$, is preferably not fixed or rigid with the escapement bar, but is permitted a limited movement thereon to an extent equal to or approximating the pitch of the ratchet teeth or the interval between successive ratchet teeth, in order to permit a movement of the registering device when said tooth $E^5$ is brought into engagement which is a multiple of the unit represented by tooth $E^4$. To this end said tooth $E^5$ is mounted upon a slide movable in a slot or way $e'$ in the escapement bar and is provided with a retracting spring $e^2$ tending to retain said tooth at one extreme of its movement. It is obvious therefore that when the escapement device is shifted to the left, Fig. 4, and tooth $E^5$ is thereby brought into engagement with the ratchet teeth, the registering devices instead of being arrested after completing a fraction of one unit as in the case of tooth $E^4$ will be permitted to advance one and a fraction units, so that upon the return of the escapement device to normal position and the reëngagement of tooth $E^3$, the registering devices will have completed an advance equal to two units.

By so proportioning the teeth of the ratchet wheels, when but three of these are employed, that the unit or pitch of one equals two type units, the second three type units and the third five type units, and controlling the movements of each ratchet wheel through an escapement competent to effect an advance of either one or two units, all the type unit measurements from two to twenty can be recorded.

Each escapement bar is maintained in and returned to normal or intermediate position by spring-actuated pins $E^6$ working in supports $E^7$ and engaging the arms $E'$, $E^2$, on opposite sides of pivot $e$, and beneath each arm $E'$, $E^2$, of each escapement bar is arranged one of a series of bars F, the latter operating to shift the escapement bars to the right or left and cause an advance of the associated registering devices of one or two units.

To adapt the registering mechanism to the machine of Patent No. 654,115, the escapement actuating bars F are disposed above the series of levers J (the punch levers) representing space value and controlled by the keys of the keyboard, so that one of said bars F may serve for all characters of the same type unit value, the bars F being notched or cut away opposite all the levers J save such as represent the same number of type units.

In adapting the improvements to the composing machine of Patent No. 897,358, the selective escapement actuating bars F may also be employed. According to this arrangement the casting of the type is governed by a series of separate controllers or selectors each having perforations controlling valves governing mechanism for bringing into position a corresponding matrix, and a portion of said machine, sufficient to indicate the application of the present improvements thereto, is illustrated in Figs. 7 and 11, the first representing the keyboard selecting and the second the mold adjusting devices.

Each finger key O pivoted at $O'$ engages a longitudinally movable bar $O^3$, the latter in turn engaging a longitudinally and laterally movable bar J to bring its shoulder $O^7$ opposite a reciprocatory driver $O^5$. The bar $O^3$ in moving also engages transverse bar $O^6$, common to all the bars $O^3$, and through a lever connected therewith actuates a valve $O^7$ to admit pressure to a motor $O^8$ the latter connected to driver $O^5$. The driver $O^5$ acting upon the bar $O^7$ imparts longitudinal motion to the escapement rod $O^9$ that controls the delivery of the selectors $O^{10}$.

In the operation of the machine of Patent No. 897,358, the selectors after being assembled to represent a line of composition are delivered one at a time, and in sequence, to the matrix selecting mechanism, the latter provided with a series of movable members T, each carrying a matrix block $N^{60}$ whose thickness or that of its carrier corresponds directly or proportionally with the setwise dimensions of the type or space represented thereby.

The selected matrices are presented singly to the mold between a fixed abutment $N^{50}$ on one side and a spring buffer $N^4$ on the other, said buffer being coupled with mold-blade $N^6$ through a sizing plate $N^{31}$. The arrangement is such that the advance of the mold blade in the direction of the fixed abutment is measured and determined by the interposed matrix, and the mold cavity is thus sized to correspond with the thickness of the matrix at the time in position.

The matrix and associated mold dimensioning device represent what may be termed the primary adjusting means, or that by which the mold is dimensioned to accord with a selected character or matrix, whose size is predetermined and not subject to variation other than by substitution. Provision is made, however, for controllably varying the measurements derived from the primary adjusting means and this is accomplished through the agency of supplemental adjusting devices normally disconnected from, but capable of being automatically coupled with, said primary means, as will presently appear.

Supported in a pivoted frame $N^{11}$ and yieldingly held elevated above the path of a bearing block $N^5$ on sizing plate $N^{31}$ is a longitudinally adjustable wedge N adapted to enter and be clamped between the rear of buffer $N^4$ and bearing block $N^5$ when said frame $N^{11}$ is in its lower or depressed position.

The members T carrying blank or space matrices are longer than those equipped with character matrices, as indicated in Fig. 11, wherein a matrix is shown in position between fixed abutment $N^{50}$ and buffer $N^4$, the carrier for the character matrix being indicated in full lines and the extension of the blank or space matrix carrier in dotted lines $N^{61}$. It follows from this construction that when a character matrix is inserted from above between abutment $N^{50}$ and buffer $N^4$ and seated on the mold its carrying member T will pass arm $N^{21}$ without displacing frame $N^{11}$ and the gaging of the mold will be effected by the conjoint action of the fixed abutment $N^{50}$, matrix $N^{60}$, buffer $N^4$, sizing plate $N^{31}$ and mold blade $N^6$; and whenever a blank or space matrix is in like manner presented to the mold the extension $N^{61}$ of its carrying member T will overlap and engage arm or extension $N^{21}$ of frame $N^{11}$, thereby depressing the latter and seating its wedge N between buffer $N^4$ and bearing block $N^5$ of sizing plate $N^{31}$, so that the subsequent advance of the sizing plate and mold blade, instead of being as before measured by the matrix alone, will now be measured by the matrix and wedge acting in conjunction, the matrix serving to position the buffer and the wedge to position the sizing plate relatively to said buffer.

For actuating the escapements E of the individual registering devices described the bars F are arranged above bars J and are actuated thereby.

Owing to inertia and friction the differential transmission gear will tend to lag behind the movement of the keys and levers J and unless means are provided to overcome this the speed at which the key-operator can proceed will be reduced. In the embodiment illustrated this objection is overcome by mounting the translating and transmitting pinions $A^9$ of each ratchet wheel upon a frame or support $A^{11}$ independent of the ratchet wheel and rotatable relative thereto on shaft H within predetermined limits, instead of mounting said pinions directly upon the ratchet wheel. Thus each frame $A^{11}$ carrying pinions $A^9$ is provided with a shoulder $A^{12}$, Fig. 3, in position to engage a shoulder $A^{23}$ on the associated ratchet wheel or drum, and a spring $A^{10}$, one end whereof is coupled with frame $A^{11}$ and the other with the ratchet wheel, serves to hold said shoulders $A^{12}$, $A^{23}$ together, and if separated, applies its pressure in a direction to cause their approach. By this means the differential gear is enabled to overtake the keys and transmit the correct amount of rotary motion to the total registering devices hereinafter described at whatever rate of speed the keyboard operator is working.

It remains to describe the total registering devices, their connection with the individual registers and differential gear, and the automatic control of the mold adjusting devices through said total registering devices.

A gear C, hereinafter styled the "units wheel", meshes with pinion $A^8$ of the units registering mechanism and is connected through a pinion $C'$ fast on its shaft $c$ with a second gear D, hereinafter styled the "ems" wheel, the latter turning freely on a stud axle or shaft $D^{10}$.

It is desirable that means should be provided whereby units wheel C may be readily disconnected from the registering devices acting upon pinion $A^8$, to permit said units wheel to be returned to an initial or zero position. In the example given this unclutching or separation is provided for by mounting the shaft $c$ of the units wheel in a frame K pivotally supported upon axle $D^{10}$ so that by the movement of frame K the units wheel can be swung into or out of gear with its driving pinion while retaining its connection with the ems wheel. A spring $K^3$, Fig. 1, engaging an arm $k'$ of frame K, serves for holding the units wheel in engagement with pinion $A^8$, while a motor $K^2$ acting in opposition to said spring provides a convenient means for releasing said units wheel from the driving pinion.

Units wheel C is graduated and marked with figures representing type units and in the example given it is marked to represent the units in an "em" as denoted by the "ems" wheel, in other words, the markings on the units wheel are divided into successive series of twenty units each, that being the number of units in an "em", each of said series being divided up in increments of five units, and the latter again subdivided into increments of one unit each. This division and subdivision is convenient in certain classes of work where great accuracy is required for readily and quickly ascertaining the odd number of units occupied in the line. Moreover, the arrangement shown facilitates the reckoning, as the number of "ems" can be read on the ems wheel at the pointer $d'$, and the odd "units" beyond an "em" can be read at the point where the unit wheel passes behind the ems wheel, or at a supplemental pointer properly located. The ems wheel D driven by the units wheel C through a pinion on shaft $c$ is in effect a line scale and is marked on its face or on an attached disk with "em" graduations. Mounted to rotate about an axis coincident with that of the ems wheel D, preferably on a sleeve carried by said wheel, is a pointer $D^3$ registering with the scale on said wheel and adapted to be set by the operator before composition begins, to measure or indicate the length of line, said pointer carrying a stop $D^4$ adapted to engage a stud or pin $C^2$ on the units wheel pinion $C'$.

In the illustration, Fig. 1, pointer $D^3$ is shown as set for a line of twenty-five "ems" and in starting position with stop $D^4$ engaged with pin $C^2$, and preventing further retrograde motion of the ems wheel so that when set back or returned at the beginning of a line said wheel will be arrested twenty five units distant from its zero position representing the opposite extremity of the line; in other words, the composition will be completed when the zero mark $d$ is brought into registry with stationary finger $d'$. During composition the ems wheel is rotated in the direction of the arrow, Fig. 1, in opposition to the pressure of a restoring spring $D^2$, one end whereof engages the ems wheel while the opposite end is attached to a fixed support, such as axle $D^{10}$, whereby power is stored for returning the ems and units wheels, at the completion of the line, when frame K is tilted to uncouple the units wheel from its driving pinion $A^8$. The return motion under the influence of spring $D^2$ is arrested at the beginning of the measure indicated on the ems wheel by the engagement of stop $D^4$ with one of the three pins $C^2$.

The measure for the line need not be in "ems" or half "ems" as indicated by the divisions on the ems wheel, but may be in units of the "em" the fraction being read upon the units wheel, and for this purpose the line scale indicator $D^3$ and stop $D^4$ are rendered adjustable relatively to the ems wheel.

An adjustment for an even number of "ems" is provided for by arranging the arm $D^3$ so that it can move longitudinally on its support on the ems wheel and clamped in position thereon by suitable means, such as the thumb nut $d^{11}$, and providing said arm with one or more (preferably two) teeth $d^2$ in position to interlock with the teeth of the ems wheel. By loosening the nut, arm $D^3$ can be moved radially against the action of a spring $d^3$ to withdraw teeth $d^2$ and permit the arm to be set on any of the graduations of the ems wheel, and when released the spring will carry the pins into engagement with the teeth of the ems wheel and the nut can then be tightened.

To provide for a fractional setting of the ems wheel the stop $D^4$ is made in the form of a bell crank lever, pivotally connected at $d^4$ to arm $D^3$, one arm of said lever being bifurcated and engaging an eccentric $D^5$ surrounding the sleeve of the ems wheel between clamping nut $d^{11}$ and arm $D^3$. Upon releasing and turning the eccentric, stop $D^4$ can be adjusted to arrest the ems wheel one or more units to one side or the other of the "em" mark indicated by arm $D^3$.

The motion of the ems wheel derived from the key controlled registering devices and representing the sum of the type units contained in the line of composition compared with the predetermined line measure, may be transmitted either directly, or, preferably, indirectly to the final registering devices. Thus, in the example illustrated, the ems wheel is furnished with a pin or projection $D'$ in position to engage and move arm $b$ of a toothed sector $B^3$ swinging from axle $D^{10}$ in rear of wheel D, said sector meshing with pinion $B^{14}$, of a transmission gear $B'$. Preferably pin $D'$ is arranged to act as a pickup for sector $B^3$, to which end its initial or zero position is set at a distance from that of the sector equal to a predetermined number of units or section of the line measure so that the sector and connected parts will not be displaced until the predetermined number of units shall have first been measured and registered. During the approach of pin $D'$ the sector is held against a fixed stop $B^{15}$ by a retracting spring $B^{16}$, Fig. 1, the latter serving to return the sector and connected drum or drums to initial position upon the withdrawal of the pin incident to the resetting of the units and ems wheels at the beginning of each line of composition.

Drum $B^*$ is provided with a plurality of circumferential cam surfaces or spirals of relatively different pitches, serially disposed according to their value, and supported to rotate in unison about a common axis. The cam surface of maximum pitch or inclination is located at one end of the series and whatever its pitch or maximum departure from the axis, the pitch of the second cam in the series will be one half the first, that of the third, one third, that of the fourth, one fourth, and so on in arithmetical progression, the number of cam surfaces employed equaling the maximum number of justifying spaces permitted or liable to occur in the longest line the machine is equipped to deal with. The lowest or starting points of the several cam surfaces are equi-distant from and parallel with the axis of rotation of the drum, and they extend through equal arcs around the drum; although, if desired, the wider portions of the first two or three cam surfaces may be cutaway or omitted, as indicated by the dotted lines, in Fig. 10, wherein the first cam of the series is represented, inasmuch as the area of justification, i. e., the amount of line shortage capable of being filled or absorbed by justification as applied to a single space, does not extend to a point on the first cam surface beyond the full lines; in other words, the maximum capacity of the mold adjusting devices controlled by the drum, if applied to a single space type, would be insufficient to fill out or justify a line the measure of whose shortage, as indicated by the revolution of the drum, falls within the dotted section of the cam, Fig. 10; hence it is necessary, when a single justifying space occurs, to diminish the shortage of the line by the addition of characters or quads until the drum in its advance presents a section of the cam surface corresponding with or less than the maximum capacity of the mold adjusting devices.

In the preferred construction illustrated drum B* is composed of a series of separate disks or rings B³ each shaped on its periphery to correspond with one of the series of cam surfaces mentioned, said disks fitting the exterior of a cylindrical body piece, the latter provided with one or more detachable heads B¹⁰, between which the series of disks are clamped and held. The drum as a whole is mounted upon a shaft B⁵ carrying pinion B¹² for engagement through idler B²⁰ with the transmission gear B⁷, the connection being of such character as to permit free movement of the drum longitudinally of the shaft, but to compel it to rotate in unison with said shaft. Any competent means may be employed to secure these results, and in the illustration the drum is fitted to slide upon its shaft and the latter has secured to it one or more rods B⁴ parallel therewith and passing through bearings in the body of the drum. The body or cylindrical center of the drum is also provided with one or more (preferably two) longitudinal openings for the passage of retracting springs B⁹, the latter attached at one end to the frame supporting rods B⁴ and at the other end to the head B¹⁰ remote therefrom, said springs serving to retain the drum in and return it to its initial position or starting point.

Means are provided whereby for each justifying space composed, drums B* will be shifted longitudinally of its shaft a uniform distance corresponding with the width of the cam surfaces i. e., the thickness of the disks B³. Thus, in the example illustrated, a bar B⁶, provided with shoulders B⁷, B⁸, engaging opposite ends of the drum and supported upon guides to move in parallel with shaft B⁵, is provided with rack teeth meshing with a pinion coupled with a ratchet wheel G', the latter engaged by a holding pawl and an actuating pawl G⁴. The actuating pawl is coupled with or controlled by the justifying space key to cause an advance of the drum each time said key is actuated, to the end that the different cam surfaces may be presented in sequence opposite a fixed point, the latter located one unit in advance of the first or one-space cam surface when the drum is in retracted or zero position, so that the first movement of the drum accompanying the selection of the first justifying space will present the first or full-measure cam, the second movement will present the second or one half measure cam and so on in sequence, the cam surface corresponding numerically with the space being each time presented.

At the point with reference to which both the longitudinal and rotary movements of the drum are performed is located a feeler M movable radially of the drum to contact with that one of the cam surfaces at the time presented. The position or degree of motion of this feeler is thus measured by the cam surface of the drum and is the quotient of the indicated line deficiency divided by the total number of justifying spaces in the line, the line deficiency being measured by the intervals between the point of contact of the feeler with the cam surface and the starting point of the latter, and the divisor or number of spaces by the pitch of the cam surface brought into alinement by the longitudinal movement of the drum.

The position of the feeler M or the degree of displacement occasioned by the interposition of the selected and adjusted cam surface, corresponds with or is proportional to the amount necessary to be added to normal spaces in order to absorb the line deficiency and thereby justify the line, hence it is only necessary to couple said feeler with the mold adjusting devices to effect automatic justification. One form of such connecting mechanism specially adapted to the machine of Patent No. 897,358 is illustrated in Fig. 11. According to this arrangement a lever M' pivoted at M² has one end engaging a shoulder on rod M⁴, the latter provided with a sliding connection with justifying wedge N permitting lateral movement of the wedge, while the opposite end of said lever is engaged by feeler M the latter guided in a casing M⁵. A spring N' acting upon rod M⁴ tends at all times to move the wedge N longitudinally in a direction to bring its base or widest portion opposite the interval between spring buffer N⁴ and bearing N⁵, indicating the maximum adjustment of the mold to produce the largest available space, while a spring m engaging feeler M tends to retract and hold the latter from contact with the drum, thus leaving the latter free to rotate and reciprocate under the influence of the line measuring and space counting mechanisms. When the composition of a line is completed and the drum B* thereby properly adjusted, feeler M is advanced by hand or otherwise against the pressure of spring m until arrested by contact with the cam surface of the drum, thereby retracting wedge N to a position corresponding with the projection of the selected cam surface at the point engaged. As this setting of the wedge is usually performed before the type and spaces for the line are produced, means should be provided for retaining the wedge in adjusted position during the formation of the line, so that it may be available in dimensioning the justifying spaces, when called for, and in the illustration this office is performed by an air brake formed by a cylinder $N^2$ through which the wedge-adjusting connection or rod $M^4$ passes, and a piston $N^3$ engaging said rod or connection. While the characters and spaces for the line are being produced pressure is maintained in cylinder $N^2$ in rear of piston $N^3$ to cause the latter to firmly clamp and hold rod $M^4$ in adjusted position, and suitable means, such as a valve $M^6$ controlling the supply pipe $M^7$, is provided for releasing the braking devices while the adjustment of the wedge is being performed and for restoring the braking pressure immediately the same is completed.

The registering mechanism described is not specifically claimed herein, the same being reserved for a divisional application Serial No. 536,313, filed January 4, 1910.

Having thus described my invention what I claim as new and desire to secure by Letters Patent, is:—

1. In a type making and composing machine such as described provided with key controlled selector assembling mechanism, a type casting mechanism controlled by the assembled selectors and provided with an adjustable mold, and line measuring and space counting devices controlled by the selector keys, and in combination therewith an automatic justifying mechanism including a feeler coupled with the mold adjusting devices and a series of inclined surfaces of relatively different pitch and movable relatively to the feeler in two directions by the line measuring and space counting devices.

2. In a type making and composing machine such as described, provided with a mold and primary adjusting means for varying the dimensions thereof, and in combination therewith, supplemental adjusting devices for the mold normally out of engagement with the latter, a line measuring and space counting mechanism, an automatic justifying mechanism controlled by the line measuring and space counting mechanism for determining the set of said supplemental mold adjusting devices, and means for coupling the primary and supplemental mold adjusting devices to cause them to act in unison for the production of justifying spaces.

3. In a type making and composing machine such as described provided with a key controlled preliminary composing mechanism and a type casting mechanism provided with an adjustable mold and supplemental mold adjusting devices and in combination therewith the following elements, to wit; line measuring and space counting devices coupled with said keys, to register the amount of matter composed thereby and the number of justifying spaces contained in said composed matter; and an automatic justification or space dimensioning mechanism the latter including means coupled with the line measuring and space counting mechanism and with said supplemental mold adjusting device to set the latter proportionally to the product of the line deficiency or shortage divided by the number of spaces.

4. In a composing machine such as described the combination of the following elements, to wit; a type casting mechanism provided with an adjustable mold and supplemental adjusting devices for varying the dimensions of the spaces; key controlled line measuring and space counting devices; a longitudinally movable revoluble drum or cylinder equipped with a series of cam or wedge surfaces of progressively varying pitch, said drum or cylinder being coupled with the line measuring devices for rotary movement and with the space counting devices for longitudinal moving; and a feeler coupled with the supplemental mold adjusting devices and adapted to engage the cam or wedge and at the point in its length determined by the rotary and longitudinal movements imparted to said drum or cylinder by the line measuring and space counting devices.

5. In a type making and composing machine such as described the combination of the following elements, to wit; an adjustable mold; an adjusting device normally inactive but capable of being coupled with the mold to dimension the latter; a plurality of wedges or inclined surfaces of relatively different pitch arranged in series; a feeler; a line measuring mechanism operating to advance the wedges longitudinally relatively to the feeler; and a space counting mechanism operating to advance the series of wedges laterally relatively to said feeler.

6. In a type making and composing machine such as described provided with supplemental mold adjusting or dimensioning devices, and in combination therewith, an automatic space dimensioning or justifying mechanism including the following elements, to wit; line measuring mechanism; space counting mechanism; a plurality of wedges or inclined surfaces differing in pitch in the proportion of $1, \frac{1}{2}, \frac{1}{3}$, and so on in arithmetical series; a feeler coupled with the supplemental mold adjusting devices for setting the latter; and connections between the line measuring and space counting mechanisms and said series of wedges for moving the latter longitudinally and laterally relatively to the feeler.

7. In a type making and composing machine such as described provided with an adjustable mold and supplemental adjusting or dimensioning devices for the latter and in combination therewith the following elements, to wit; a revoluble and longitudinally movable drum provided with a graded series of peripheral inclines or cam surfaces; a feeler movable radially of said drum; line measuring mechanism coupled with said drum to rotate the latter; space counting mechanism coupled with the drum to advance it longitudinally; coupling devices intermediate the feeler and said supplemental mold adjusting devices for positioning the latter; and means for retaining said supplemental mold adjusting devices in adjusted position.

8. In a type making and composing machine such as described provided with a mold and means for varying the dimensions of its casting cavity and in combination therewith the following elements, to wit; a line measuring mechanism provided with means whereby it can be set to the measure of the matter to be composed; means for registering the number of justifying space type; and an automatic justification or adjusting mechanism controlling the mold dimensioning means and in turn controlled by the line measuring and space registering devices and including graduated series of inclines and coöperating feeler movable relatively longitudinally of said inclines and laterally thereof.

RICHARD CORNELIUS ELLIOTT.

Witnesses:
 H. W. CATMUS,
 H. D. JAMESON.